United States Patent
Takayama (10) Patent No.: US 9,036,046 B2
(45) Date of Patent: May 19, 2015

(54) IMAGE PROCESSING APPARATUS AND METHOD WITH WHITE BALANCE CORRECTION

(75) Inventor: Masahiro Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/596,803

(22) Filed: Aug. 28, 2012

(65) Prior Publication Data

US 2013/0057725 A1 Mar. 7, 2013

(30) Foreign Application Priority Data

Sep. 7, 2011 (JP) ................. 2011-195255

(51) Int. Cl.
 H04N 9/73 (2006.01)
 H04N 9/64 (2006.01)
 H04N 5/235 (2006.01)

(52) U.S. Cl.
 CPC ............... *H04N 9/643* (2013.01); *H04N 9/735* (2013.01); *H04N 5/2354* (2013.01)

(58) Field of Classification Search
 USPC .......................................... 348/222.1, 223.1
 See application file for complete search history.

(56) References Cited

U.S. PATENT DOCUMENTS

| | | |
|---|---|---|
| 2003/0011686 A1 | 1/2003 | Higuchi |
| 2003/0090750 A1 | 5/2003 | Takahashi |
| 2004/0233298 A1 * | 11/2004 | Aotsuka ..................... 348/223.1 |
| 2005/0219587 A1 | 10/2005 | Hayaishi |
| 2006/0284991 A1 | 12/2006 | Ikeda |
| 2007/0268379 A1 | 11/2007 | Suzuki et al. |
| 2008/0211925 A1 * | 9/2008 | Misawa et al. ............. 348/223.1 |
| 2011/0205392 A1 | 8/2011 | Yokoi |
| 2012/0008009 A1 * | 1/2012 | Ito et al. ..................... 348/223.1 |
| 2012/0057045 A1 * | 3/2012 | Shimizu ..................... 348/223.1 |

FOREIGN PATENT DOCUMENTS

| | | |
|---|---|---|
| JP | 2000-212641 A | 8/2000 |
| JP | 3540485 B2 | 7/2004 |

OTHER PUBLICATIONS

U.S. Appl. No. 13/596,793, filed Aug. 28, 2012, Yusuke Shimizu.
U.S. Appl. No. 13/596,797, filed Aug. 28, 2012, Kenji Ouchi.

* cited by examiner

*Primary Examiner* — Gevell Selby
(74) *Attorney, Agent, or Firm* — Canon USA Inc IP Division (57) ABSTRACT

An image processing apparatus determines whether a second light source is present with respect to image data, generates, when it is determined that the second light source is present, first image data based on a first white balance correction value and second image data based on a second white balance correction value, and combines the first image data and the second image data according to a determined combination ratio.

19 Claims, 10 Drawing Sheets

| | LOW | | | HIGH Bv |
|---|---|---|---|---|
| LARGE | Judge_Value00 | Judge_Value01 | Judge_Value02 | Judge_Value03 |
| | Judge_Value04 | Judge_Value05 | Judge_Value06 | Judge_Value07 |
| | Judge_Value08 | Judge_Value09 | Judge_Value10 | Judge_Value11 |
| SMALL | Judge_Value12 | Judge_Value13 | Judge_Value14 | Judge_Value15 |

NUMBER OF BLOCKS (CountNum)

IMAGE PROCESSING APPARATUS AND METHOD WITH WHITE BALANCE CORRECTION

BACKGROUND OF THE INVENTION

1. Field of the Invention

The present invention relates to a white balance control technology for image data.

2. Description of the Related Art

An imaging apparatus that uses an image sensor such as a digital camera or a digital video camera has a white balance control function of adjusting a color tone of image data acquired by photographing. The white balance control is classified into manual white balance control and automatic white balance control. The manual white balance control is for first imaging a white object to calculate a white balance coefficient, and then applying the calculated white balance coefficient to the entire screen. The automatic white balance control is for automatically detecting a portion likely to be white from the captured image data, calculating a white balance coefficient from an average value among color components of the entire screen, and then applying the calculated white balance coefficient to the entire screen.

In conventional white balance control, when a light source different from that of flash light is present in image data in a flash light emission scene, white balance control is carried out by applying the white balance coefficient calculated as described above to the entire screen. It has, therefore, been difficult to carry out white balance control for achieving appropriate colors for the respective light sources. For example, when a low color temperature light source such as a low color temperature bulb light source is present as ambient light in the flash light emission scene, flash light is from a high color temperature light source. Thus, when white balance is matched with the flash light, the white balance is not matched with the low color temperature light source. On the other hand, when the white balance is matched with the low color temperature light source, the white balance is not matched with the flash light. Even when white balance control is carried out by setting white balance between both light sources, the white balance is matched with neither of both light sources. Accordingly, a region irradiated with the flash light is bluish, and a region irradiated with light from the low color temperature light source is reddish.

Japanese Patent No. 3540485 discusses the following technology. That is, according to the technology discussed in Japanese Patent No. 3540485, image data captured during flash light emission and image data captured during nonflash light emission are compared with each other for each arbitrary object region to calculate a ratio of the data, and a contribution of the flash light is determined based on a value of the ratio. Then, by selecting a white balance control value for each object region according to the determined contribution, white balance control is carried out.

However, the technology discussed in Japanese Patent No. 3540485 deals with the white balance control when the flash light is emitted. Thus, the technology cannot be applied when no flash light is emitted. Further, development processing is carried out after the white balance control value is varied from one object region to another. This causes color reproduction and other control processes to be inappropriate with respect to the white balance control value. As a result, an appropriate color tone cannot be sufficiently reproduced.

SUMMARY OF THE INVENTION

The present invention is directed to an image processing apparatus and an image processing method for generating image data of an appropriate color even when a plurality of light sources are mixed.

According to an aspect of the present invention, an image processing apparatus includes a correction value determination unit configured to determine a first white balance correction value corresponding to a first light source in captured image data and a second white balance correction value corresponding to a second light source in the image data, a light source determination unit configured to determine whether the second light source is present with respect to the image data, a generation unit configured to generate, when the light source determination unit determines that the second light source is present, first image data from the image data based on the first white balance correction value, and second image data from the image data based on the second white balance correction value, a combination ratio determination unit configured to determine a combination ratio of the first image data and the second image data based on a difference between a color evaluation value of the image data and a white evaluation value under the second light source, and a combining unit configured to combine the first image data and the second image data according to the combination ratio determined by the combination ratio determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
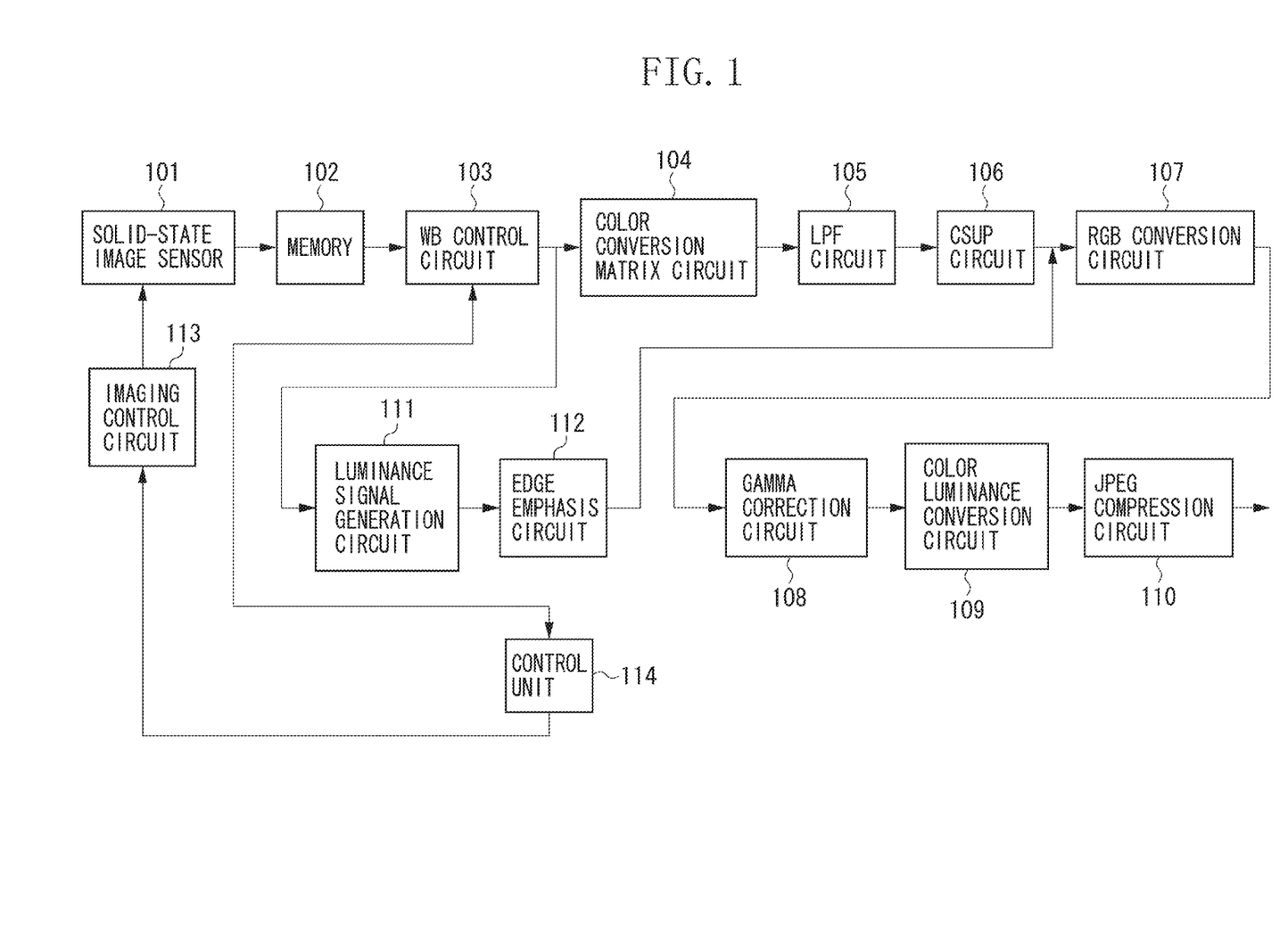
FIG. 1 is a block diagram illustrating a configuration example of a digital camera according to an exemplary embodiment of the present invention.

FIG. 1 is a block diagram illustrating a configuration example of a digital camera according to a first exemplary embodiment of the present invention. The digital camera of the exemplary embodiment is an application example of an image processing apparatus. In FIG. 1, a solid-state image sensor 101 includes a charge-coupled device (CCD) or a complementary metal-oxide semiconductor (CMOS), has its surface covered with red (R), green (G), and blue (B) color filters such as a Bayer array, and can carry out color photographing. When an object image is formed on the solid-state image sensor 101, the solid-state image sensor 101 generates image data (image signal) to store the data in a memory 102.

A control unit 114 calculates a shutter speed and an aperture value for enabling the entire image data to be bright, and calculates a driving amount of a focus lens to focus on an object present in an in-focus region. Then, the exposure value (shutter speed and aperture value) and the driving amount of the focus lens calculated by the control unit 114 are output to an imaging control unit 113, and each component is controlled based on each value. A white balance (WB) control circuit 103 calculates a WB correction value based on the image data stored in the memory 102, and executes WB correction for the image data stored in the memory 102 by using the calculated WB correction value. A method for calculating the WB correction value by the WB control circuit 103 will be described in detail below.

A color conversion matrix circuit 104 adds color gains to the image data WB-corrected by the WB control circuit 103 to reproduce the image data with optimal colors, and converts the data into color difference signals R-Y and B-Y. A low-pass filter (LPF) circuit 105 limits bands of the color difference signals R-Y and B-Y. A chroma suppress (CSUP) circuit 106 suppresses a false color signal of a saturated portion among image signals band-limited by the LFP circuit 105. The image data WB-corrected by the WB control circuit 103 is also output to a luminance signal generation circuit 111 to generate a luminance signal Y. An edge emphasis circuit 112 executes edge emphasis processing for the generated luminance signal Y.

An RGB conversion circuit 107 converts the color difference signals R-Y and B-Y output from the CSUP circuit 106 and the luminance signal Y output from the edge emphasis circuit 112 into RGB signals. A gamma (γ) correction circuit 108 executes gradation correction for the converted RGB signals. A color luminance conversion circuit 109 converts the gradation-corrected RGB signals into YUV signals. A Joint Photographic Experts Group (JPEG) compression circuit 110 compresses the YUV signals generated by the color luminance conversion circuit 109 by the JPEG method. The signal output from the JPEG compression circuit 110 is recorded as image data in an external recording medium or an internal recording medium.

Next, a method for calculating a WB correction value by the WB control circuit 103 according to the first exemplary embodiment will be described. First, referring to FIG. 2, a method for calculating a first white balance correction value (first WB correction value) will be described. The first WB correction value is calculated by normal white balance control for a first light source. This processing is for calculating the WB correction value based on WB control using a black-body locus.

Figure 2:
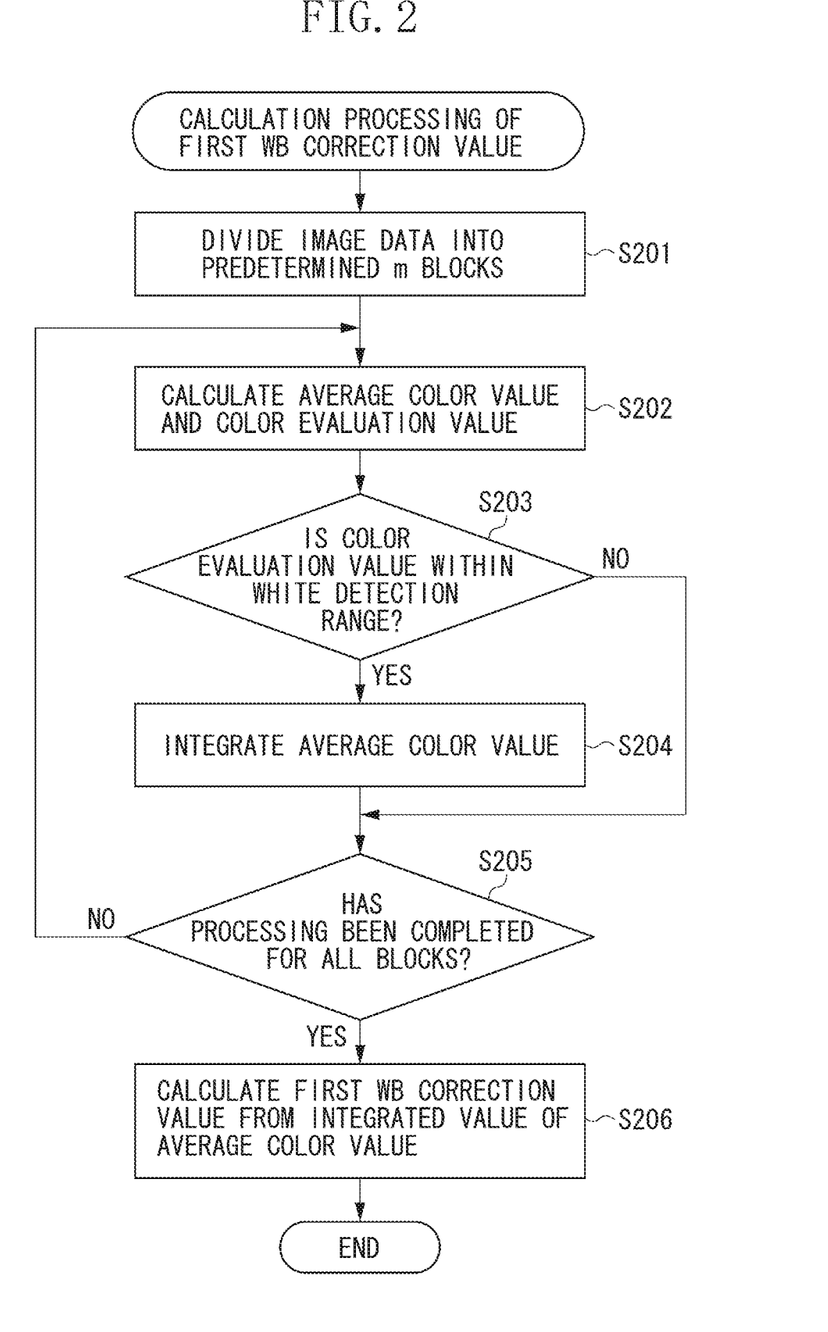
FIG. 2 is a flowchart illustrating a method for calculating a first white balance correction value (first WB correction value).

In step S201, the WB control circuit 103 reads the image data stored in the memory 102, and divides the image data into predetermined m blocks. In step S202, the WB control circuit 103 adds and averages pixel values for respective colors for blocks (1 to m) to calculate average color values (R[i], G[i], B[i]), and calculates a color evaluation value (Cx[i], Cy[i]) by using the following expressions:

$$Cx[i]=(R[i]-B[i])/Y[i] \times 1024$$

$$Cy[i]=(R[i]+B[i]-2G[i])/Y[i] \times 1024$$

where $Y[i]=(R[i]+2G[i]+B[i])/4$.

Figure 3:
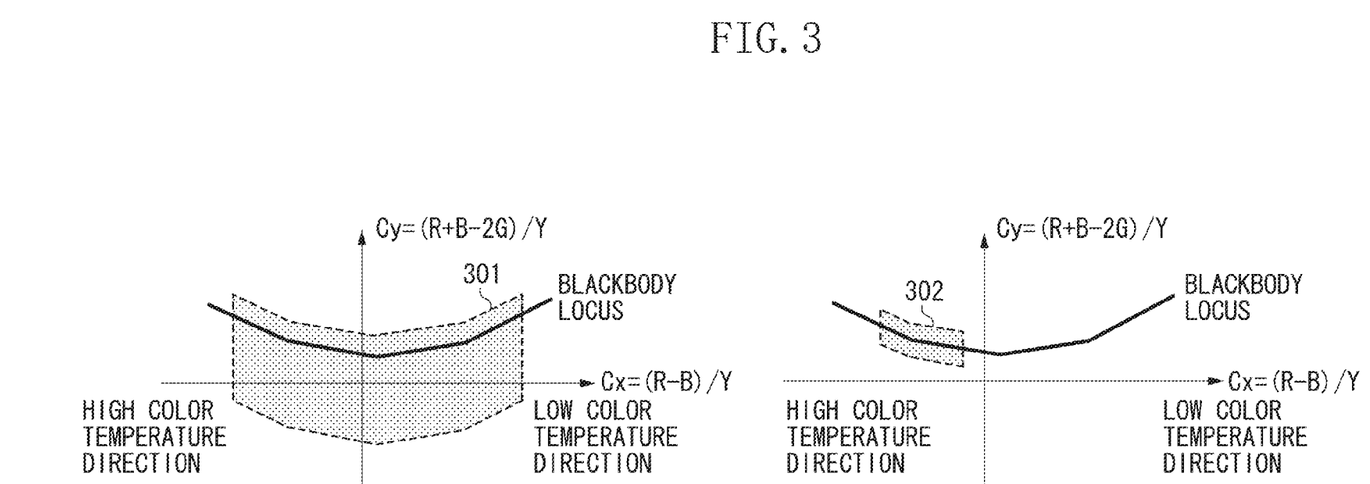
FIG. 3 is a graph used for white detection.

In step S203, the WB control circuit 103 determines whether the color evaluation value (Cx[i], Cy[i]) of an i-th block is within a preset white detection range 301 illustrated in FIG. 3. The white detection range 301 is set by photographing a white object under different light sources and plotting calculated color evaluation values. The white detection range can be set individually according to a photographing mode. In FIG. 3, a negative direction of the x coordinate (Cx) represents a color evaluation value when a white object is photographed with a high color temperature light source, while a positive direction thereof represents a color evaluation value when a white object is photographed with a low color temperature light source. The y coordinate (Cy) indicates a degree of a green component in a light source, and the green component is larger toward a negative direction of the y coordinate.

When the color evaluation value (Cx[i], Cy[i]) of the i-th block is within the preset white detection range 301 (YES in step S203), the processing proceeds to step S204. On the other hand, when the color evaluation value (Cx[i], Cy[i]) of the i-th block is not within the preset white detection range 301 (NO in step S203), the processing skips step S204 to proceed to step S205.

In step S204, the WB control circuit 103 determines that the i-th block is white to integrate the average color values (R[i], G[i], B[i]) of the block. The processing of steps S203 and S204 can be represented by the following expressions:

$$SumR = \sum_{i=0}^{m} Sw[i] \times R[i]$$

$$SumG = \sum_{i=0}^{m} Sw[i] \times G[i]$$

$$SumG = \sum_{i=0}^{m} Sw[i] \times B[i]$$

In the expressions, when the color evaluation value (Cx[i], Cy[i]) is within the white detection range 301, Sw[i] is set to 1. When the color evaluation value (Cx[i], Cy[i]) is not within the white detection range 301, Sw[i] is set to 0. Accordingly, in steps S203 and S204, whether to integrate the average color values (R[i], G[i], and B[i]) is substantially determined.

In step S205, the WB control circuit 103 determines whether the processing has been completed for all the blocks. When not completed (NO in step S205), the processing returns to step S202 to be repeated. On the other hand, when completed (YES in step S205), the processing proceeds to step S206.

In step S206, the WB control circuit 103 calculates a first WB correction value (WBCo1_R1, WBCo1_G1, WBCo1_B1) by using integrated values (SumR1, SumG1, SumB1) of the acquired average color values by using the following expressions:

$$WBCo1\_R1=SumY1 \times 1024/SumR1$$

$$WBCo1\_G1=SumY1 \times 1024/SumG1$$

$WBCo1\_B1 = SumY1 \times 1024/SumB1$ where $Sum\_Y1 = (SumR1 + 2 \times SumG1 + SumB1)/4$.

In emitting flash light, by using the flash light white detection range 302 illustrated in FIG. 3, the first WB correction value is calculated as in the case of the aforementioned calculation method of the WB correction value. Because a known flash light source is used, a white detection range can be detected. In emitting flash light, a WB correction value of the flash light can be set beforehand as a known first WB correction value.

Next, a method for determining a second white balance correction value (second WB correction value) for a second light source will be described. The second WB correction value (WBCo2_R, WBCo2_G, WBCo2_B) is determined by using predetermined values for the respective light sources. For these values, values calculated beforehand by photographing white objects under the respective light sources are used. For example, when the second light source is a mercury lamp, a WB correction value determined beforehand for the mercury lamp is used as the second WB correction value. In this case, when a plurality of types of light sources are present, the second WB correction value can be varied from one type to another. For example, when two types of mercury lamps are present, the WB correction value can be varied between the mercury lamps.

Figure 4:
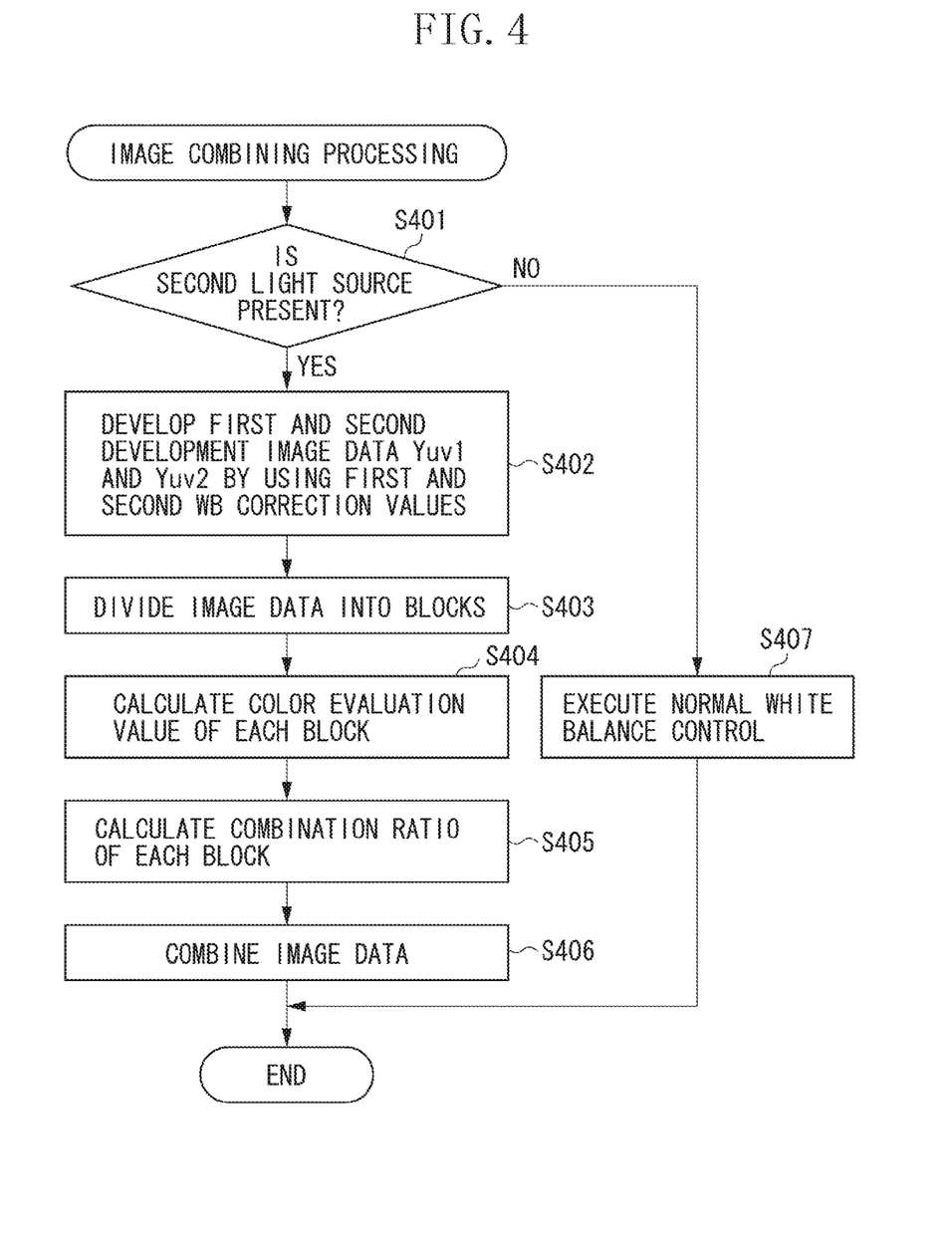
FIG. 4 is a flowchart illustrating combining processing of image data according to a first exemplary embodiment.
Figure 5:
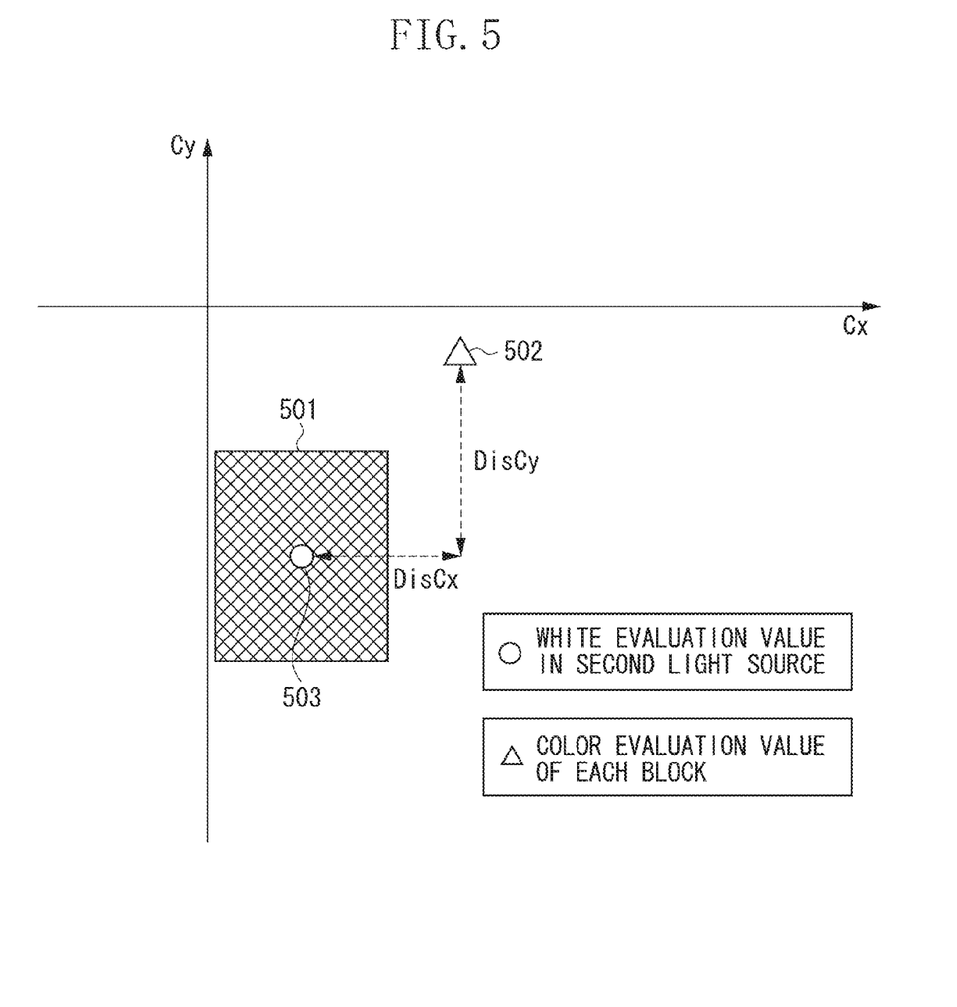
FIG. 5 illustrates an example of a relationship between a white evaluation value of a second light source and a color evaluation value of each block.

Next, referring to the flowchart of FIG. 4, combining processing of the imaged data of the digital camera according to the first exemplary embodiment will be described. In step S401, the WB control circuit 103 determines a scene for the image data stored in the memory 102 to determine whether a second light source is present. For example, when it is determined that a mercury lamp is present as a second light source, as illustrated in FIG. 5, the WB control circuit 103 determines whether a color evaluation value 502 of the image data is within a predetermined area 501 including a white color evaluation value (hereinafter, white evaluation value) 503 under the predetermined mercury lamp light source. Specifically, the WB control circuit 103 determines whether the color evaluation value 502 of the image data is present within the range of the predetermined area 501 based on a distance (DisCx, DisCy) from the white evaluation value 503 under the mercury lamp light source to the color evaluation value 502 of the image data. The WB control circuit 103 detects blocks of color evaluation values present within the predetermined area 501 from each block divided from the image data, and calculates the number of detected blocks as a determination evaluation value for determining whether any second light source is present.

Figure 6A:
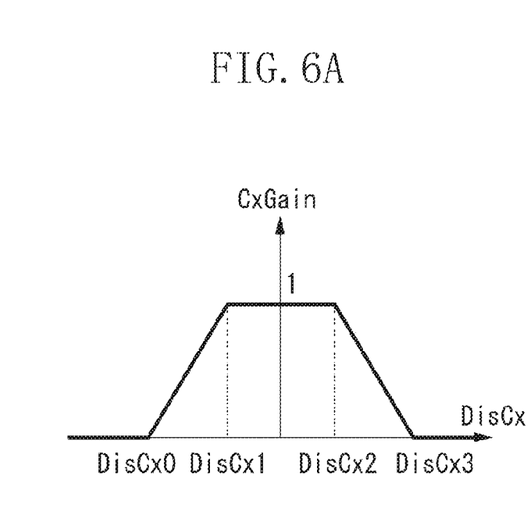
FIGS. 6A, 6B, and 6C illustrate weighting (gain) processing when the second light source is detected.
Figure 6B:
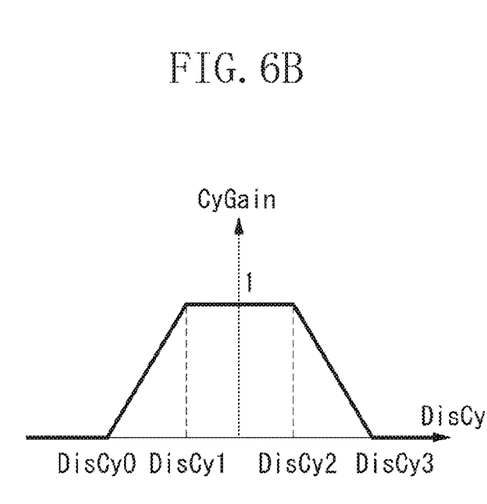
Figure 6C:
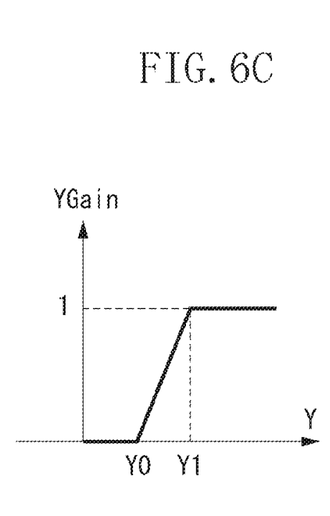

When a color evaluation value of each block is close to the white evaluation value 503 under the second light source, a probability of the second light source is higher. Farther from the white evaluation value 503, the probability is lower. Accordingly, the WB control circuit 103 multiplies weight (CxGain) corresponding to a distance (DisCx) of the Cx direction illustrated in FIG. 6A, and by weight (CyGain) corresponding to a distance (DisCy) of the Cy direction illustrated in FIG. 6B to integrate the numbers of blocks. Detection accuracy drops in a very dark block or a saturated block. Thus, the WB control circuit 103 integrates the numbers of blocks by multiplication with weight (YGain) corresponding to a block luminance value (Y) illustrated in FIG. 6C. In other words, the WB control circuit 103 integrates the numbers of blocks by the following expression:

$$CountNum = \sum_{n=0}^{m} (\min(CxGain(n), CyGain(n), YGain(n)))$$

Figure 7:
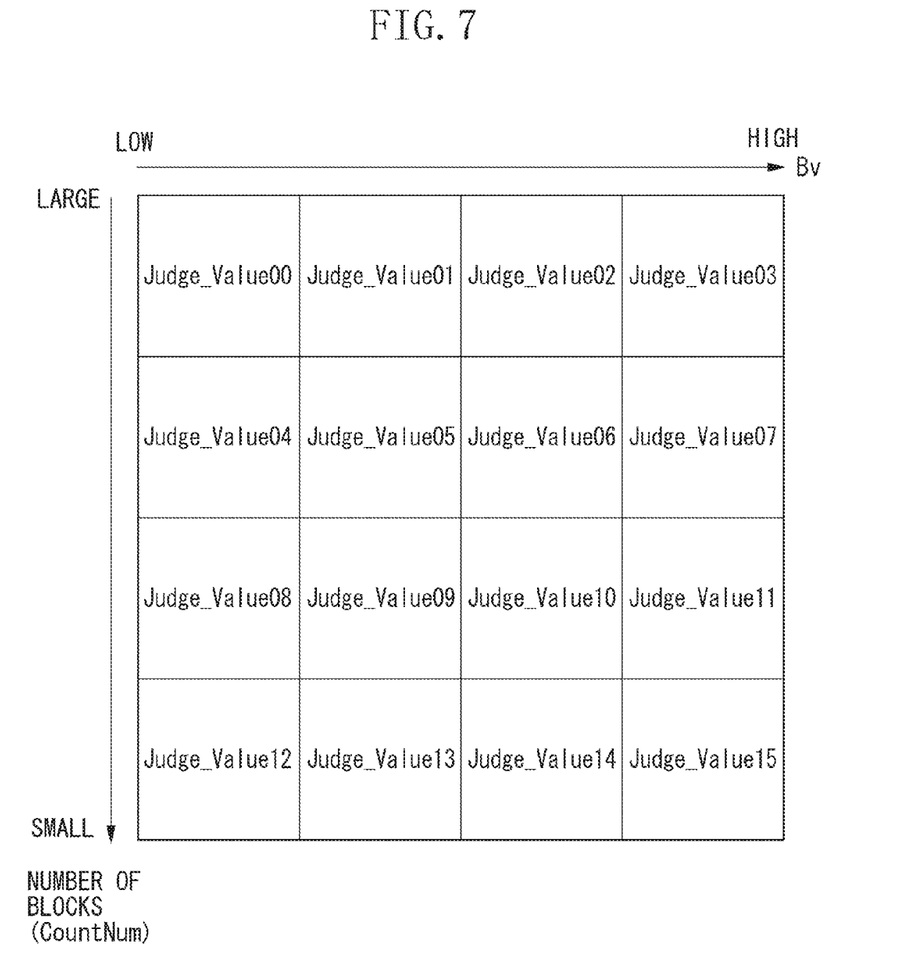
FIG. 7 illustrates a determination evaluation value when the second light source is detected.
Figure 8:
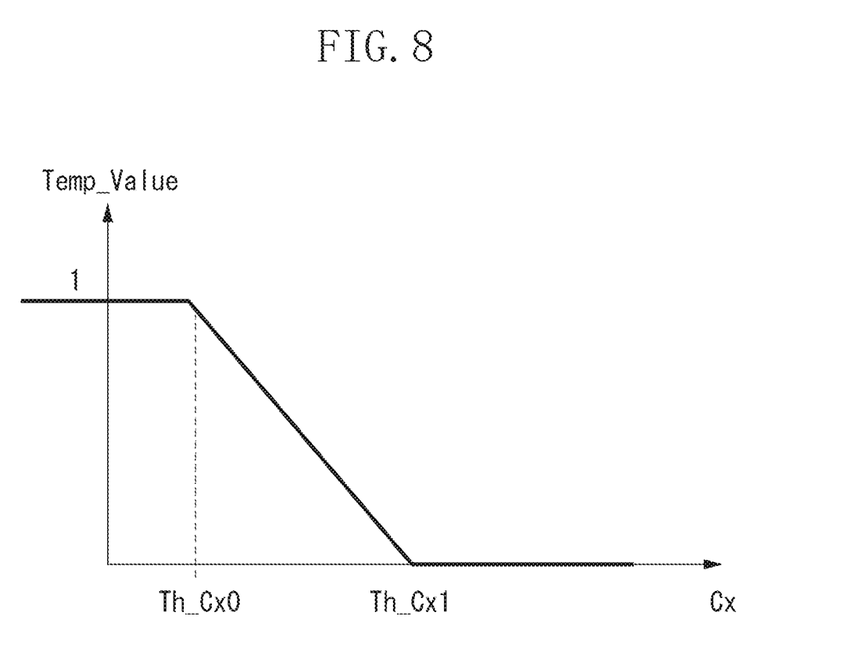
FIG. 8 illustrates a determination evaluation value based on a color temperature when the second light source is detected.

In addition to the number of blocks, brightness (Bv) of a photographing environment can be added as a determination factor. For example, since the mercury lamp is present in a relatively dark scene such as a nightscape, the WB control circuit 103 calculates a determination evaluation value (Judge_Value) based on brightness (Bv) and the number of blocks (CountNum) in a matrix illustrated in FIG. 7. As the calculated determination evaluation value is higher, a presence probability of the second light source is higher. Further, a color temperature in the first WB correction value that is normal white balance control can be added as a determination factor. It is because, for example, when a low color temperature light source is determined in the first WB correction value, it is difficult for the mercury lamp to be present in the scene such as a nightscape. In other words, the WB control circuit 103 determines whether any second light source is present in view of a determination evaluation value (Temp_Value) based on a color temperature output in calculation processing of the first WB correction value illustrated in FIG. 8. A final determination evaluation value (Final_Judge) is represented by the following expression:

Final_Judge=Judge_Value×Temp_Value

In step S401, when the determination evaluation value is determined to be lower than a predetermined threshold value, the WB control circuit 103 determines that no second light source is present, and the processing proceeds to step S407. In step S407, the WB control circuit 103 executes, without carrying out any combining processing of the image data, normal white balance control by using the first WB correction value calculated in the processing illustrated in FIG. 2. On the other hand, in step S401, when the determination evaluation value is determined to be equal to or higher than the threshold value, the WB control circuit 103 determines that a second light source is present, and the processing proceeds to step S402.

In step S402, the WB control circuit 103 executes white balance correction for the image data stored in the memory 102 by using the first WB correction value to generate first development image data Yuv1. Similarly, the WB control circuit 103 executes white balance correction for the image data stored in the memory 102 by using the second WB correction value to generate second development image data Yuv2. In step S403, the WB control circuit 103 divides each of the image data stored in the memory 102, the first development image data Yuv1, and the second development image data Yuv2 into n blocks.

In step S404, the WB control circuit 103 adds and averages pixel values for the respective colors for each block of the image data stored in the memory 102 to calculate average color values (R[i], G[i], B[i]). Then, as in the case of step S202, the WB control circuit 103 calculates a color evaluation value (Cx[i], Cy[i]). The color evaluation value (Cx[i], Cy[i]) calculated in step S202 can directly be used. In this case, when a saturated pixel is present, a pixel value of the saturated pixel and a pixel value of a pixel of another color corresponding to the pixel are not included in addition processing. For example, when a certain R pixel is a saturated pixel, a pixel value of the R pixel, and a pixel value of a G pixel and a pixel value of a B pixel corresponding to the R pixel are not included in the addition processing.

Figure 9:
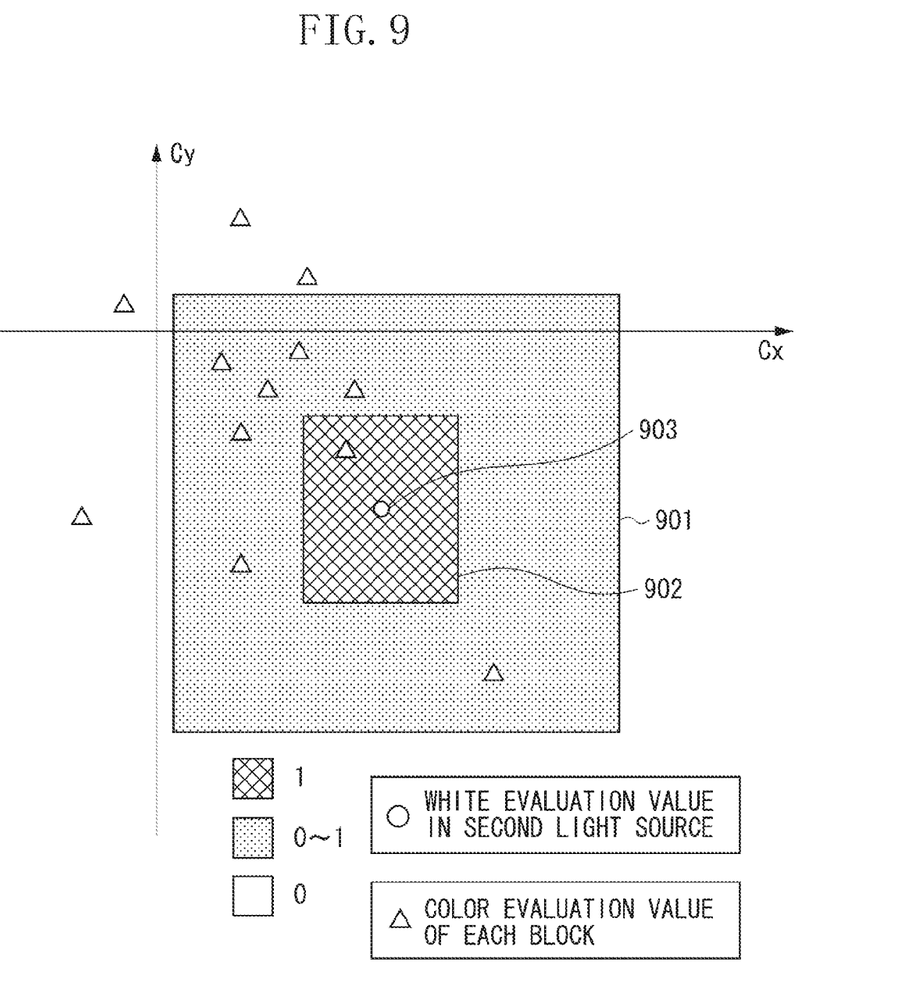
FIG. 9 illustrates an example of a relationship between the white evaluation value of the second light source and the color evaluation value of each block used when a combination ratio is calculated.

In step S405, the WB control circuit 103 sets an evaluation frame and an inner frame according to each light source, and calculates a combination ratio of each block based on a difference between the second WB correction value and the color evaluation value of each block. For example, in a scene using a mercury lamp as a light source, as illustrated in FIG. 9, the WB control circuit 103 sets an evaluation frame 901 and an inner frame 902 for the mercury lamp by using, as a center of gravity, a white evaluation value 903 under the mercury lamp light source predetermined as a second WB correction value. Then, the WB control circuit 103 calculates a combination ratio of each block based on a distance between the predetermined white evaluation value 903 under the mercury lamp light source and the color evaluation value of each block. The evaluation frame 901 and the inner frame 902 are set based on a color evaluation value calculated beforehand by photographing a white object under the mercury lamp light source.

First, for a block where a difference between the color evaluation value and the white evaluation value 903 under the mercury lamp light source is small and a color evaluation value is present in the inner frame 902 illustrated in FIG. 9, a combination ratio α[i] of the block is set to 1. Then, for a block where a color evaluation value is present in a region between the inner frame 902 and the evaluation frame 901 illustrated in FIG. 9, the WB control circuit 103 calculates a combination ratio α[i] as follows. The WB control circuit 103 linearly reduces a combination ratio from the inner frame 902 to the evaluation frame 901 to set the inner frame 902 to combination ratio α[i]=1 and the evaluation frame 901 to combination ratio α[i]=0, and calculates a combination ratio α[i] of the block. For a block where a color evaluation value is present outside the evaluation frame 901, the WB control circuit 103 sets a combination ratio α[i] to 0.

The evaluation frame 901 and the inner frame 902 can be formed into arbitrary shapes in place of square shapes. For example, the evaluation frame 901 can be formed into an elliptical (circular) shape. Further, for example, even in a scene that uses a low color temperature light source such as a bulb light source, the evaluation frame and the inner frame only need to be changed to match the light source. Thus, a combination ratio can be calculated by processing similar to the combination ratio calculation method in the scene under the mercury lamp light source.

In step S406, the WB control circuit 103 combines the first development image data Yuv1 and the second development image data Yuv2 by using the combination ratio α[i] of each block to generate combined image data Yuv3. To calculate a color evaluation value (Y3[i], u3[i], v3[i]) of the combined image data Yuv3, a color evaluation value (Y1[i], u1[i], v1[i]) of the first development image data Yuv1 and a color evaluation value (Y2[i], u2[i], v2[i]) of the second development image data Yuv2 are used. In other words, the color evaluation value (Y3[i], u3[i], v3[i]) of the combined image data Yuv3 is calculated by the following expressions:

$$Y3[i]=Y1[i]*(1-\alpha[i])+Y2[i]*\alpha[i]$$

$$u3[i]=u1[i]*(1-\alpha[i])+u2[i]*\alpha[i]$$

$$v3[i]=v1[i]*(1-\alpha[i])+v2[i]*\alpha[i]$$

To reduce color shifting generated on a boundary portion of the blocks, by further executing pixel interpolation processing in step S405, the WB control circuit 103 can calculate a combination ratio α'[j] for each pixel from the combination ratio α[i] of each block. For example, the WB control circuit 103 calculates the combination ratio α'[j] for each pixel from the combination ratio α[i] of each block by using bilinear interpolation as pixel interpolation processing. In step S406, the WB control circuit 103 combines the first development image data Yuv1 and the second development image data Yuv2 by using the combination ratio α'[j] for each pixel to generate combined image data Yuv3. To calculate a color evaluation value (Y3[j], u3[j], v3[j]) of the combined image data Yuv3, a color evaluation value (Y1[j], u1[j], v1[j]) of the first development image data Yuv1 and a color evaluation value (Y2[j], u2[j], v2[j]) of the second development image data Yuv2 are used. In other words, the WB control circuit 103 calculates the color evaluation value (Y3[j], u3[j], v3[j]) of the combined image data Yuv3 by the following expressions:

$$Y3[j]=Y1[j]*(1-\alpha'[j])+Y2[j]*\alpha'[j]$$

$$u3[j]=u1[j]*(1-\alpha'[j])+u2[j]*\alpha'[j]$$

$$v3[j]=v1[j]*(1-\alpha'[j])+v2[j]*\alpha'[j]$$

To reduce the amount of calculation at the WB control circuit 103, only the u component and the v component that are color components can be combined. Specifically, the WB control circuit 103 calculates the color evaluation value (Y3[i], u3[i], v3[i]) of the combined image data Yuv3 by the following expressions in the combining processing of the image data:

$$Y3[i]=Y1[i]$$

$$u3[i]=u1[i]*(1-\alpha[i])+u2[i]*\alpha[i]$$

$$v3[i]=v1[i]*(1-\alpha[i])+v2[i]*\alpha[i]$$

In the combining processing of the image data, the Yuv form is used for the development image data. However, for example, when the RGB form is used as an image form, in place of the expressions used in step S406, the following expressions are used. That is, the WB control circuit 103 calculates a color evaluation value (R1[i], G1[i], B1[i]) of development image data RGB1 developed by using the first WB correction value and a color evaluation value (R2[i], G2[i], B2[i]) of development image data RGB2 developed by using the second WB correction value. Then, the WB control circuit 103 calculates color evaluation values (R3[i], G3[i], B3[i]) of combined image data RGB3 by the following expressions:

$$R3[i]=R1[i]*(1-\alpha[i])+R2[i]*\alpha[i]$$

$$G3[i]=G1[i]*(1-\alpha[i])+G2[i]*\alpha[i]$$

$$B3[i]=B1[i]*(1-\alpha[i])+B2[i]*\alpha[i]$$

In the combining processing of the image data, when two or more types of light sources are present, two or more pieces of development image data can be combined. For example, when flash light is emitted in the scene using the mercury lamp, the WB control circuit 103 determines, in addition to the first WB correction value and the second WB correction value, a third WB correction value as in the case of the method for determining the second WB correction value. Then, the WB control circuit 103 develops three pieces of image data by using the three WB correction values to combine the image data.

Thus, according to the first exemplary embodiment, in the scene where a plurality of different light sources is present, the light source is determined and image data is generated for setting both the main object and the background to appropriate colors, and an image suitable for the user can be provided.

Next, a second exemplary embodiment of the present invention will be described. In the first exemplary embodiment, the combining processing of the image data is carried out when the second light source is determined to be present, and the normal white balance processing is carried out when no second light source is determined to be present. In the second exemplary embodiment, however, an evaluation value of a likelihood of a second light source is calculated, and a combination ratio is controlled according to the evaluation value to carry out combining processing of image data. Only a difference from the first exemplary embodiment will be described. A configuration of a digital camera according to the second exemplary embodiment is similar to that illustrated in FIG. 1 and, thus in the description of the second exemplary embodiment, the reference numerals illustrated in FIG. 1 will be used.

Figure 10:
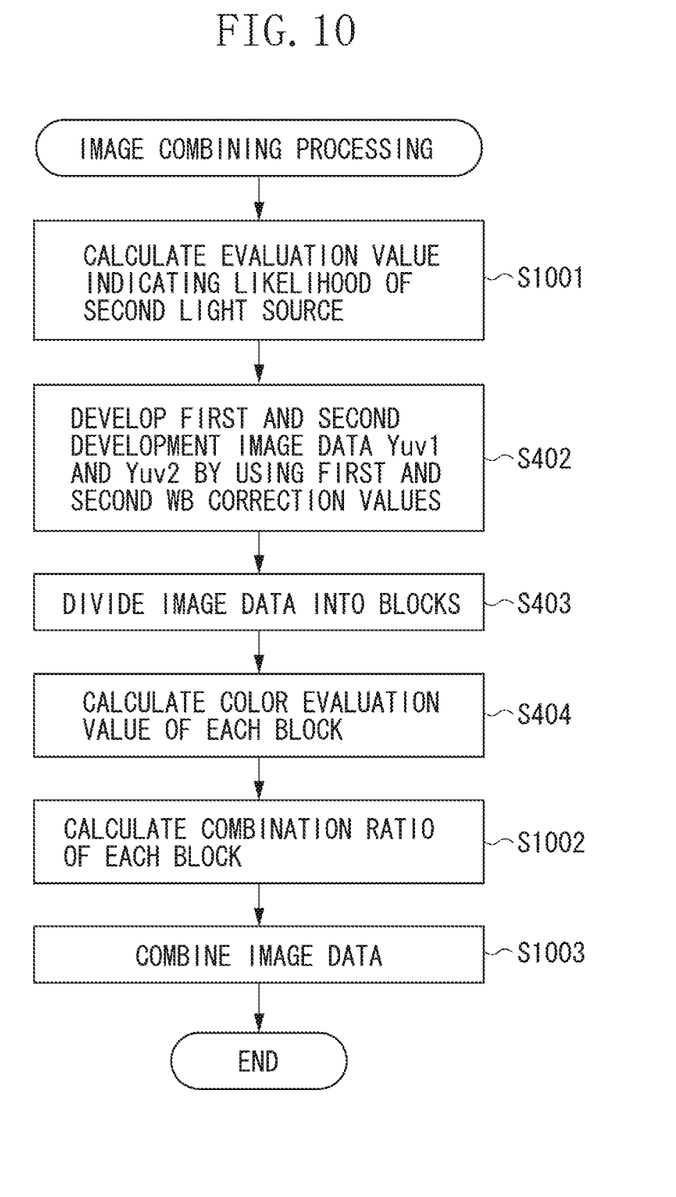
FIG. 10 is a flowchart illustrating combining processing of image data according to a second exemplary embodiment.

Hereinafter, referring to FIG. 10, the combining processing of the image data by the digital camera according to the second exemplary embodiment will be described. In step S1001, the WB control circuit 103 calculates an evaluation value indicating a likelihood of a second light source. In this case, the WB control circuit 103 calculates the evaluation value indicating the likelihood of a second light source based on brightness and the number of blocks similar to those illustrated in FIG. 7. In the second exemplary embodiment, the evaluation value is used as a control value (β: 0 to 1) for calculating a combination ratio. Steps S402 to S404 are similar to steps S402 to S404 illustrated in FIG. 4.

In step S1002, the WB control circuit 103 calculates a combination ratio α[i] based on the calculated control value. For example, when the evaluation value indicating the likelihood of a second light source is low, the control value β is lower, and a usage ratio of the second WB correction value is lower.

In step S1003, the WB control circuit 103 combines first development image data Yuv1 and second development image data Yuv2 by using the combination ratio α[i] of each block and the control value β to generate combined image data Yuv3. To calculate a color evaluation value (Y3[$i$], u3[$i$], v3[$i$]) of the combined image data Yuv3, the WB control circuit 103 uses the color evaluation values (Y1[$i$], u1[$i$], v1[$i$]) of the first development image data Yuv1 and the color evaluation value (Y2[$i$], u2[$i$], v2[$i$]) of the second development image data Yuv2. In other words, the WB control circuit 103 calculates the color evaluation value (Y3[$i$], u3[$i$], v3[$i$]) of the combined image data Yuv3 by the following expressions:

$$Y3[i]=Y1[i]*(1-\alpha[i]*\beta)+Y2[i]*\alpha[i]*\beta$$

$$u3[i]=u1[i]*(1-\alpha[i]*\beta)+u2[i]*\alpha[i]*\beta$$

$$v3[i]=v1[i]*(1-\alpha[i]*\beta)+v2[i]*\alpha[i]*\beta$$

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-195255 filed Sep. 7, 2011, which is hereby incorporated by reference herein in its entirety.

What is claimed is:

1. An image processing apparatus comprising:
a correction value determination unit configured to determine a first white balance correction value corresponding to a first light source in captured image data and a second white balance correction value corresponding to a second light source in the image data;
a light source determination unit configured to determine whether the second light source is present with respect to the image data by comparing a determination evaluation value calculated from the image data with a predetermined threshold value;
a generation unit configured to generate, when the light source determination unit determines that the second light source is present, first image data from the image data based on the first white balance correction value, and second image data from the image data based on the second white balance correction value;
a combination ratio determination unit configured to determine a combination ratio of the first image data and the second image data based on a difference between a color evaluation value of the image data and a white evaluation value under the second light source; and
a combining unit configured to combine the first image data and the second image data according to the combination ratio determined by the combination ratio determination unit.

2. The image processing apparatus according to claim 1, wherein the light source determination unit is configured to determine whether the second light source is present with respect to the image data based on a distance between a color evaluation value of each block in the image data and the white evaluation value under the second light source.

3. The image processing apparatus according to claim 1, wherein the light source determination unit is configured to determine whether the second light source is present with respect to the image data, based on brightness values of the image data.

4. The image processing apparatus according to claim 1, wherein the light source determination unit is configured to determine whether the second light source is present with respect to the image data based on a color temperature in the first white balance correction value.

5. The image processing apparatus according to claim 1, wherein the combining unit is configured not to combine the first image data and the second image data when the light source determination unit determines that the second light source is not present with respect to the image data.

6. The image processing apparatus according to claim 1, wherein the correction value determination unit is configured to determine the first white balance correction value based on white balance control using a blackbody locus.

7. The image processing apparatus according to claim 1, wherein the correction value determination unit is configured to determine the second white balance correction value by using a value predetermined for each light source.

8. The image processing apparatus according to claim 1, further comprising a color evaluation value calculation unit configured to calculate a color evaluation value of the image data for each block,
wherein the combination ratio determination unit is configured to determine the combination ratio for each block based on a difference between the color evaluation value of the image data for each block and the white evaluation value under the second light source.

9. The image processing apparatus according to claim 8, wherein the combination ratio determination unit is configured to determine a combination ratio for each pixel from the combination ratio for each block by pixel interpolation processing.

10. The image processing apparatus according to claim 8, wherein the color evaluation calculation unit is configured not to use, when calculating the color evaluation value of the image data, a pixel value of a saturated pixel and a pixel value of a pixel of another color corresponding to the saturated pixel for calculation of an average color value.

11. The image processing apparatus according to claim 1, wherein the combining unit is configured to combine only color components of the first image data and the second image data.

12. An image processing method performed by an image processing apparatus, the image processing method comprising:
determining a first white balance correction value corresponding to a first light source in captured image data and a second white balance correction value corresponding to a second light source in the image data;
determining whether the second light source is present with respect to the image data by comparing a determination evaluation value calculated from the image data with a predetermined threshold value;
generating, when it is determined that the second light source is present, first image data from the image data based on the first white balance correction value, and second image data from the image data based on the second white balance correction value;
determining a combination ratio of the first image data and the second image data based on a difference between a color evaluation value of the image data and a white evaluation value under the second light source; and
combining the first image data and the second image data according to the combination ratio.

13. An image processing apparatus comprising:
a correction value determination unit configured to determine a first white balance correction value corresponding to a first light source in captured image data and a second white balance correction value corresponding to a second light source in the image data;
a light source determination unit configured to determine whether the second light source is present with respect to the image data;
a generation unit configured to generate, when the light source determination unit determines that the second light source is present, first image data from the image data based on the first white balance correction value, and second image data from the image data based on the second white balance correction value;
a combination ratio determination unit configured to determine a combination ratio of the first image data and the second image data based on a difference between a color evaluation value of the image data and a white evaluation value under the second light source; and
a combining unit configured to combine the first image data and the second image data according to the combination ratio determined by the combination ratio determination unit,
wherein the light source determination unit is configured to determine whether the second light source is present with respect to the image data, based on brightness values of the image data.

14. The image processing apparatus according to claim 13, wherein the combining unit is configured not to combine the first image data and the second image data when the light source determination unit determines that the second light source is not present with respect to the image data.

15. The image processing apparatus according to claim 13, wherein the correction value determination unit is configured to determine the first white balance correction value based on white balance control using a blackbody locus.

16. The image processing apparatus according to claim 13, wherein the correction value determination unit is configured to determine the second white balance correction value by using a value predetermined for each light source.

17. The image processing apparatus according to claim 13, further comprising a color evaluation value calculation unit configured to calculate a color evaluation value of the image data for each block,
wherein the combination ratio determination unit is configured to determine the combination ratio for each block based on a difference between the color evaluation value of the image data for each block and the white evaluation value under the second light source.

18. An image capturing apparatus comprising:
an image capturing unit configured to capture an image;
a correction value determination unit configured to determine a first white balance correction value corresponding to a first light source in a captured image data and a second white balance correction value corresponding to a second light source in the image data;
a light source determination unit configured to determine whether the image data is captured under the second light source by comparing a determination evaluation value calculated from the image data with a predetermined threshold value;
a generation unit configured to generate, when the light source determination unit determines that the image data is captured under the second light source, first image data from the image data based on the first white balance correction value, and second image data from the image data based on the second white balance correction value;
a combination ratio determination unit configured to determine a combination ratio of the first image data and the second image data based on a difference between a color evaluation value of the image data and a white evaluation value under the second light source; and
a combining unit configured to combine the first image data and the second image data according to the combination ratio determined by the combination ratio determination unit.

19. The image capturing apparatus according to claim 18, further comprising a color evaluation value calculation unit configured to calculate a color evaluation value of the image data for each block,
wherein the combination ratio determination unit is configured to determine the combination ratio for each block based on a difference between the color evaluation value of the image data for each block and the white evaluation value under the second light source.

* * * * *